US009261879B2

(12) United States Patent
Ferguson et al.

(10) Patent No.: US 9,261,879 B2
(45) **Date of Patent: *Feb. 16, 2016**

(54) USE OF UNCERTAINTY REGARDING OBSERVATIONS OF TRAFFIC INTERSECTIONS TO MODIFY BEHAVIOR OF A VEHICLE

(71) Applicant: Google Inc., Mountain View, CA (US)

(72) Inventors: David I. Ferguson, San Francisco, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,111

(22) Filed: May 27, 2014

(65) Prior Publication Data

US 2014/0277901 A1 Sep. 18, 2014

Related U.S. Application Data

(63) Continuation of application No. 13/441,996, filed on Apr. 9, 2012, now Pat. No. 8,761,991.

(51) Int. Cl.

| | |
|---|---|
| ***G01C 22/00*** | (2006.01) |
| ***G05D 1/00*** | (2006.01) |
| ***B60W 30/18*** | (2012.01) |
| ***G08G 1/0962*** | (2006.01) |
| ***G08G 1/0967*** | (2006.01) |

(52) U.S. Cl.

CPC ....... *G05D 1/0088* (2013.01); *B60W 30/18154* (2013.01); *G08G 1/09623* (2013.01); *G08G 1/096725* (2013.01); *G08G 1/096758* (2013.01); *G08G 1/096783* (2013.01); *B60W 2550/22* (2013.01)

(58) Field of Classification Search

CPC .................................................... G05D 1/0088

USPC ............ 701/27, 117, 118, 301; 340/905, 917, 340/988, 933, 907

See application file for complete search history.

(56) References Cited

U.S. PATENT DOCUMENTS

| | | | | |
|---|---|---|---|---|
| 6,728,623 | B2 * | 4/2004 | Takenaga et al. | 701/96 |
| 7,979,172 | B2 | 7/2011 | Breed | |
| 2008/0162027 | A1 | 7/2008 | Murphy et al. | |
| 2009/0303077 | A1 | 12/2009 | Onome et al. | |
| 2010/0106356 | A1 * | 4/2010 | Trepagnier et al. | 701/25 |
| 2011/0026826 | A1 * | 2/2011 | Euler | 382/173 |
| 2011/0182475 | A1 | 7/2011 | Fairfield et al. | |

OTHER PUBLICATIONS

Teichman, Alex, "Towards 3D Object Recognition via Classification of Arbitrary Object Tracks", International Conference on Robotics and Automation (ICRA), May 9-13, 2011, p. 4034-4041.

* cited by examiner

*Primary Examiner* — Luke Huynh

(74) *Attorney, Agent, or Firm* — McDonnell Boehnen Hulbert & Berghoff LLP

(57) ABSTRACT

Methods and devices for using uncertainty regarding observations of traffic intersections to modify behavior of a vehicle are disclosed. In one embodiment, an example method includes determining a state of a traffic intersection using information from one or more sensors of a vehicle. The vehicle may be configured to operate in an autonomous mode. The method may also include determining an uncertainty associated with the determined state of the traffic intersection. The method may further include controlling the vehicle in the autonomous mode based on the determined state of the traffic intersection and the determined uncertainty.

20 Claims, 9 Drawing Sheets

100

START

DETERMINING A STATE OF A TRAFFIC INTERSECTION USING INFORMATION FROM ONE OR MORE SENSORS OF A VEHICLE, WHEREIN THE VEHICLE IS CONFIGURED TO OPERATE IN AN AUTONOMOUS MODE — 102

DETERMINING AN UNCERTAINTY ASSOCIATED WITH THE DETERMINED STATE OF THE TRAFFIC INTERSECTION — 104

CONTROLLING THE VEHICLE IN THE AUTONOMOUS MODE BASED ON THE DETERMINED STATE OF THE TRAFFIC INTERSECTION AND THE DETERMINED UNCERTAINTY — 106

END

300

302

304

| STATE | | OUTPUT |
|---|---|---|
| State of traffic signal A | State of traffic signal B | Uncertainty |
| RED | RED | Low |
| RED | YELLOW | Medium |
| RED | GREEN | High |
| YELLOW | RED | Medium |
| YELLOW | YELLOW | Low |
| YELLOW | GREEN | High |
| GREEN | RED | High |
| GREEN | YELLOW | Medium |
| GREEN | GREEN | Low |
| ANY | UNKNOWN | High |
| UNKNOWN | ANY | High |

FIGURE 3

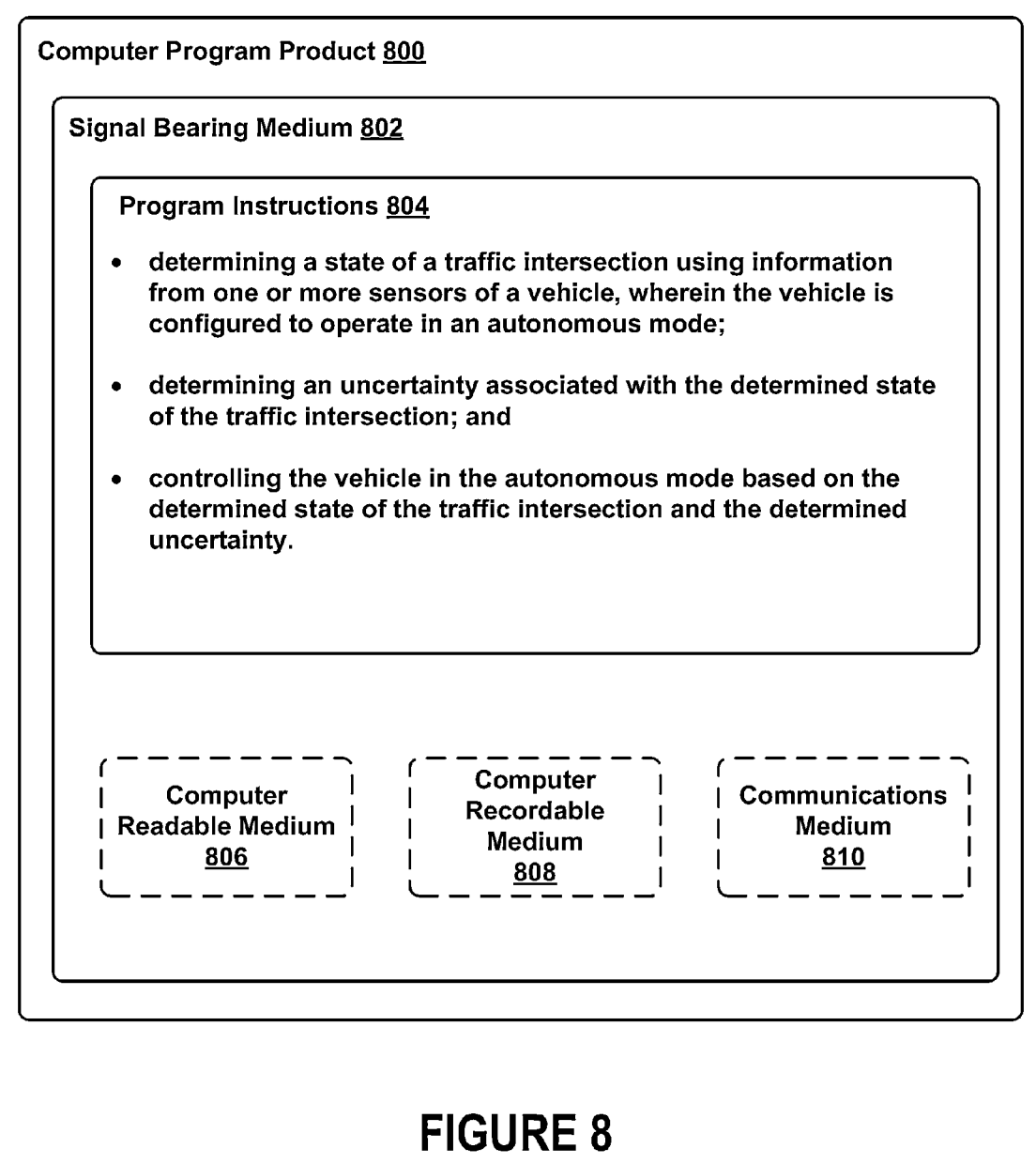

Computer Program Product 800

Signal Bearing Medium 802

Program Instructions 804

- determining a state of a traffic intersection using information from one or more sensors of a vehicle, wherein the vehicle is configured to operate in an autonomous mode;
- determining an uncertainty associated with the determined state of the traffic intersection; and
- controlling the vehicle in the autonomous mode based on the determined state of the traffic intersection and the determined uncertainty.

Computer Readable Medium 806

Computer Recordable Medium 808

Communications Medium 810

FIGURE 8

USE OF UNCERTAINTY REGARDING OBSERVATIONS OF TRAFFIC INTERSECTIONS TO MODIFY BEHAVIOR OF A VEHICLE

CROSS-REFERENCE TO RELATED APPLICATIONS

This application is a continuation of U.S. patent application Ser. No. 13/441,996 filed Apr. 9, 2012, the contents of which are hereby incorporated by reference.

BACKGROUND

Some vehicles are configured to operate in an autonomous mode in which the vehicle navigates through an environment with little or no input from a driver. Such a vehicle may include one or more sensors that are configured to sense information about the environment. The vehicle may use the sensed information to navigate through the environment.

For example, if an output of the sensors is indicative that the vehicle is approaching an obstacle, the vehicle may navigate around the obstacle. Additionally, a vehicle may sense information about traffic signs and traffic signals. For example, traffic signs may provide regulatory information or warning information while traffic signals positioned at road intersections, pedestrian crossings, and other locations may be used to control competing flows of traffic.

SUMMARY

In one example aspect, a method is disclosed that includes determining a state of a traffic intersection using information from one or more sensors of a vehicle. The vehicle may be configured to operate in an autonomous mode. The method may also include determining an uncertainty associated with the determined state of the traffic intersection. According to the method, the vehicle may be controlled in the autonomous mode based on the determined state of the traffic intersection and the determined uncertainty.

In another example aspect, a non-transitory computer-readable medium is disclosed having stored therein instructions executable by a computing device to cause the computing device to perform functions. The functions may include determining a state of a traffic intersection using information from one or more sensors of a vehicle. The vehicle may be configured to operate in an autonomous mode. The functions may further include determining an uncertainty associated with the determined state of the traffic intersection. Additionally, the functions may include controlling the vehicle in the autonomous mode based on the determined state of the traffic intersection and the determined uncertainty.

In yet another example aspect, a vehicle configured to be operated in an autonomous mode is disclosed. The vehicle may include one or more sensors, a memory, a processor, and instructions stored in the memory and executable by the processor. The one or more sensors may be configured to obtain information associated with a traffic intersection, and the instructions may be executable to determine a state of the traffic intersection based on the obtained information. The instructions may be further executable to determine an uncertainty associated with the determined state of the traffic intersection. Additionally, the instructions may be executable to control the vehicle in the autonomous mode based on the determined state of the traffic intersection and the determined uncertainty.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 is an example state table for determining an uncertainty associated with a state of a traffic intersection.

FIG. 8 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

A vehicle, such as a vehicle configured to operate autonomously, may be configured to determine a state of a traffic intersection. For example, the vehicle may use one or more sensors such as a camera and/or laser to determine a state of a traffic intersection. In some instances, the traffic intersection may be governed by a traffic signal or traffic sign, and information associated with the traffic signal or traffic sign may be used to determine the state of the traffic intersection.

Additionally, an estimate of the state of the traffic intersection may be noisy or imperfect. For instance, sensors used to determine the state of the traffic intersection may be noisy or locations of traffic signals and traffic signs may change. Consequently, a determined state of the traffic intersection may be imperfect, and an uncertainty associated with the determined state of the traffic intersection may be determined. A control system of the vehicle and/or a driver or passenger of the vehicle may use the determined state of the traffic intersection as well as the uncertainty associated with the determined state to modify behavior of the vehicle.

As an example, a vehicle may determine a state of a traffic signal controlling an upcoming traffic intersection. Using information from one or more sensors, the vehicle may determine that the state of the traffic signal is green, but an amount of noise may be associated with the determined state. For instance, the traffic signal may be partially occluded or a color of the green traffic light may not be as sharply contrasting as expected. In such an instance, behavior of the vehicle may be modified such that the vehicle cautiously approaches the traffic intersection, and observes additional information about the traffic intersection before proceeding. Alternatively, if the uncertainty associated with the state of the traffic intersection is low, the vehicle may proceed with confidence through the traffic intersection without traveling slowly. Other additional modifications for control of the vehicle based on an uncertainty associated with a determined state of a traffic intersection are also possible.

Figure 1:
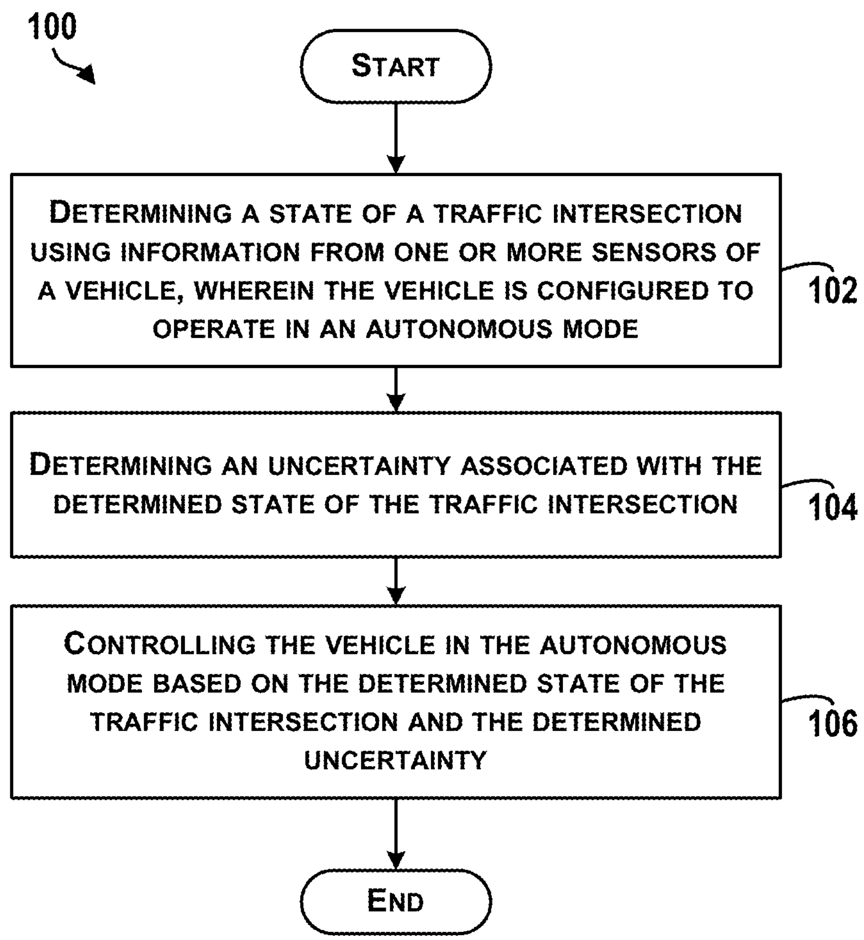
FIG. 1 is a block diagram of an example method of controlling a vehicle.

FIG. 1 is a block diagram of an example method 100 of controlling a vehicle. Method 100 shown in FIG. 1 presents an embodiment of a method that could be used with the vehicles described herein, for example, and may be performed by a vehicle or components of a vehicle, or more generally by a server or other computing device. Method 100 may include one or more operations, functions, or actions as illustrated by one or more of blocks 102-106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the block diagram shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

Figure 6:
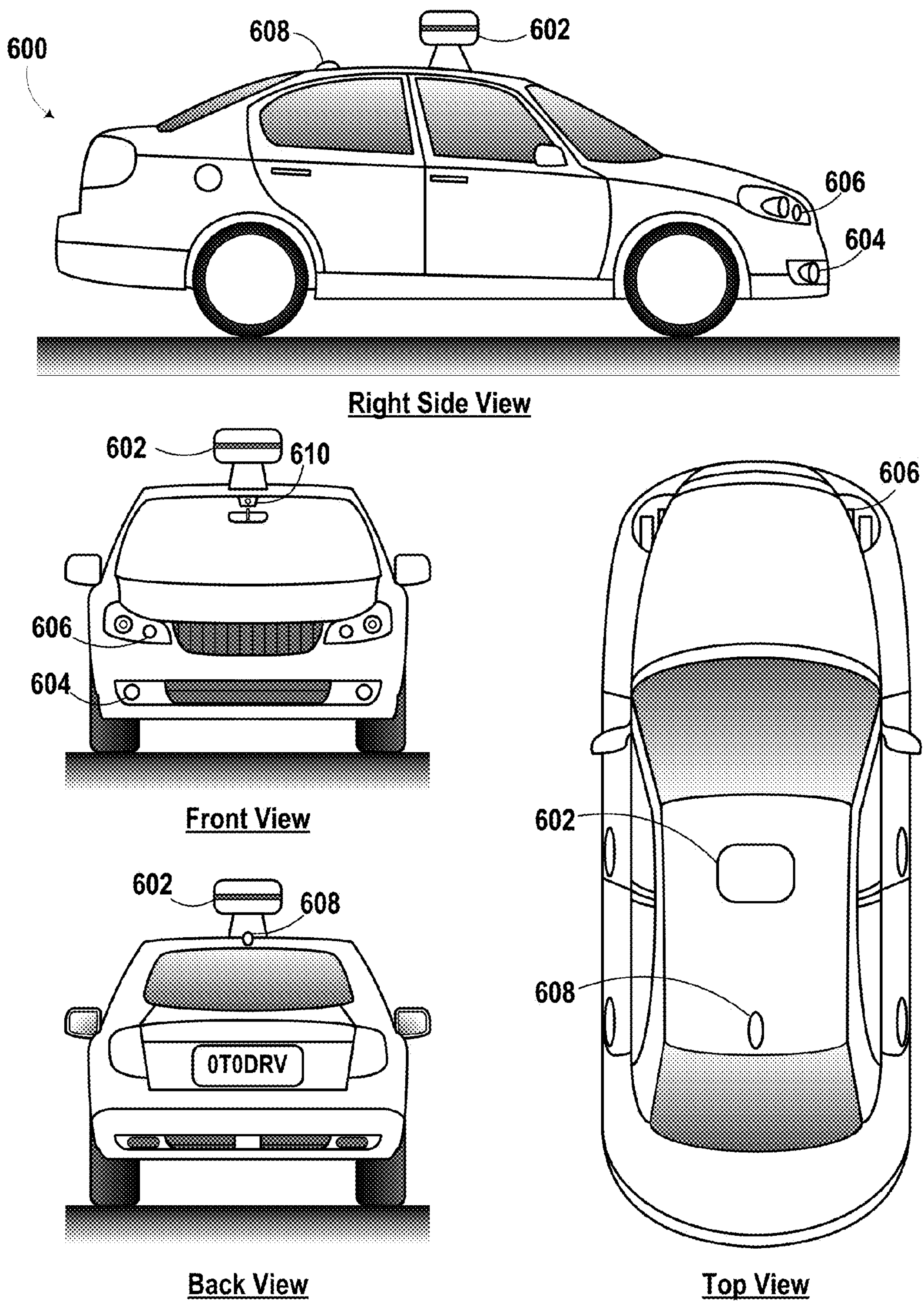
FIG. 6 illustrates an example vehicle, in accordance with an embodiment.
Figure 7:
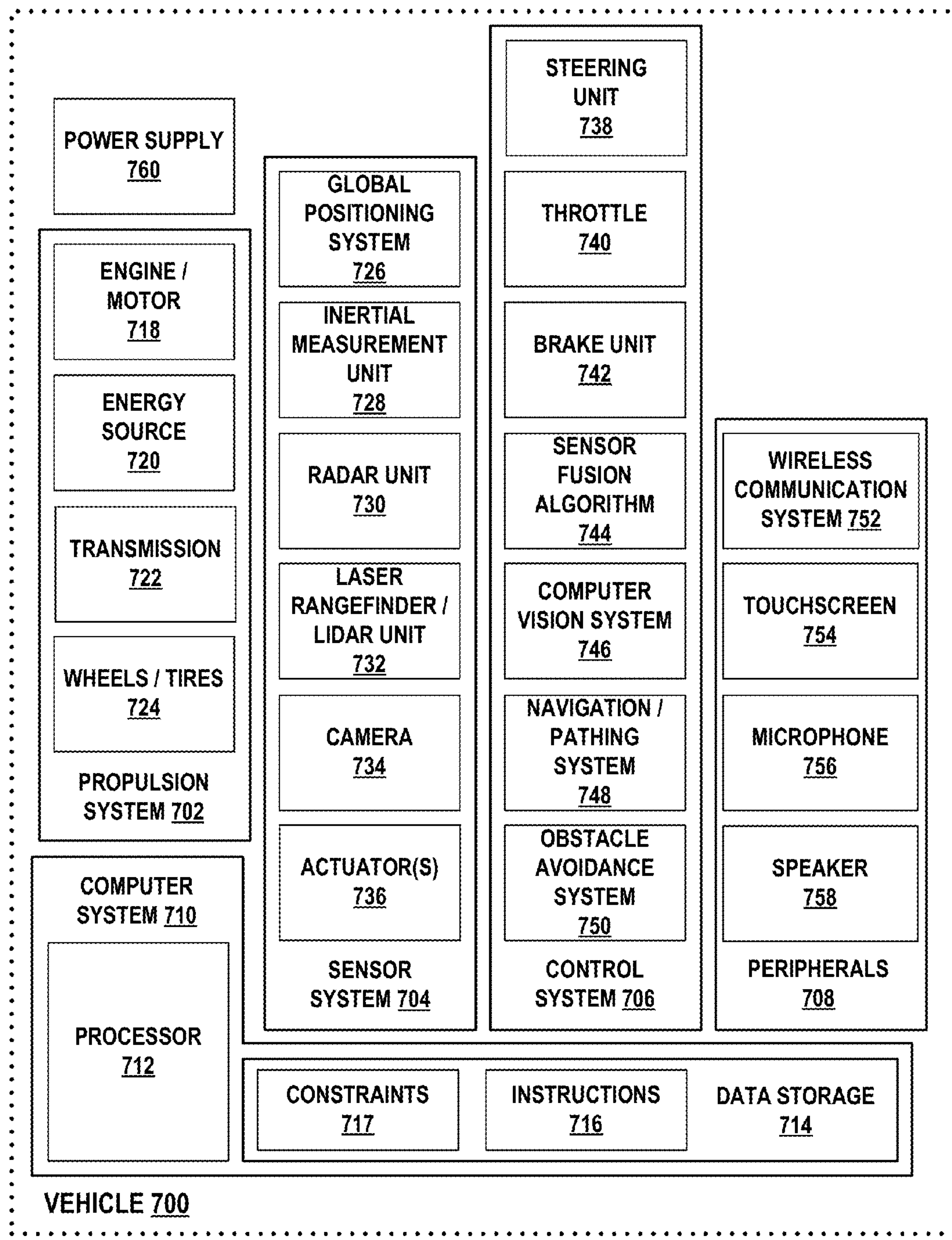
FIG. 7 is a simplified block diagram of an example vehicle, in accordance with an embodiment.

As shown, initially, at block 102, the method 100 includes determining a state of a traffic intersection using information from one or more sensors of a vehicle. In one example, the vehicle may be configured to operate autonomously. The vehicle described with respect to FIGS. 6 and 7 is one such example of a vehicle that may be configured to operate autonomously. In some instances, a control command as determined based on the state of the traffic intersection may be used to assist a driver of the vehicle or provided as input to a control system of the vehicle.

In one example, determining a state of the traffic intersection may include determining a state of a traffic signal. For example, one or more sensors of the vehicle may be used to scan a target area to determine a state of the traffic signal. The one or more sensors may include imaging and/or non-imaging components. For example, various types of cameras may be mounted in various configurations to the vehicle to capture an image of an upcoming area. In one instance, a camera may be positioned to face straight ahead and mounted behind or near a rear-view mirror. Additionally, a camera may capture a specific region of interest, such as a 2040×1080 region, of a camera with a fixed lens with a 30 degree field of view. The camera may be calibrated to detect traffic signals at various distances to ensure a reasonable braking distance. In a further example, gain and shutter speeds of the camera may be set to avoid saturation of traffic lights during the day and/or night.

In another example, the one or more sensors may include a three-dimensional (3D) scanning device configured to determine distances to surfaces of objects in an upcoming area. In one instance, a structured light projection device and camera may be used to determine a three-dimensional point cloud describing the upcoming area. In another instance, a laser and/or radar device such as a LIDAR or laser rangefinder may scan the target area to determine distances to objects. In other instances, a stereo camera or time-of-flight camera may be used for range imaging.

Based on information from the one or more sensors, a traffic signal may be detected. In some instances, a pattern, template, shape, or signature that is expected for traffic signals may be identified. As an example, a traffic signal classifier may find a pattern of red, yellow, and green objects with appropriate size and aspect ratios within an image. Any example image processing techniques may be used to identify one or more portions of the image matching a known pattern. Template matching is one possible example.

In an instance, in which the 3D position of a traffic signal is known, a prediction of where a traffic signal should appear in an image may be used to determine the state of the traffic signal. For example, based on an estimate of a position of the vehicle with respect to the 3D position (e.g., using a GPS), a predicted position for the traffic signal can be projected into the image from of a camera of the vehicle. In one example, the predicted position may be an axis-aligned bounding box which selects a portion of the image. However, other example regions or shapes are also possible. The portion of the image may then be analyzed to determine the state of the traffic signal.

For example, the predicted position may be processed to identify brightly colored red or green objects, and the predicted position may change as the position of the vehicle approaches the traffic signal. In some instances, if a traffic signal is detected, a state of the traffic signal may be determined. Determining the state of the traffic signal may include determining which object in a pattern of red, yellow, and green objects of an image of a traffic signal is illuminated. In one instance, an image processing method may be used to determine a distinction between brightness of the red, yellow, and green objects to determine an object with the highest brightness. The object with the highest brightness may be assumed to be on, for example. In an instance in which multiple traffic signals are detected, a state of a traffic signal corresponding to a traffic lane of the vehicle may be determined. It will be understood that the specific structure of red, yellow, and green lights is merely an example. Traffic signals may have varied and sometimes complex geometries and these additional geometries may also be detected.

In an example in which a three-dimensional point cloud is determined, an object in the 3D point cloud having a shape that is expected for traffic signals may be detected. For example, 3D point cloud based object recognition systems may be used to identify features describing interest points within the 3D point cloud. The features may subsequently be compared to features expected for a 3D model of one or more types of traffic signals to recognize groups of interest points as objects within the 3D point cloud that are traffic signals. Given a recognized traffic signal, color information (e.g., an image) associated with the location of the 3D object may be analyzed to determine the state of the traffic signal.

Information about other types of traffic signals and traffic signs may also be used to determine a state of a traffic intersection. For example, a traffic intersection may be governed by one or more traffic signals having flashing red and/or yellow lights. In an instance in which a four-way traffic intersection is governed by a traffic signal having flashing red lights and/or stop signs, determining the state of the traffic intersection may involve determining which of several possible vehicles at the traffic intersection has precedence. For example, object recognition via classification of arbitrary objects tracks may enable the vehicle to recognize and determine locations of vehicles, pedestrians, and/or bicycles based on 3D data. If a track of an object in the 3D data is classified as a vehicle, a processor may be able to determine when or if a vehicle is present at a four-way stop. Accordingly, precedence for the traffic intersection may be straightforwardly determined based on priority or right of way for various scenarios. Other example object recognition methods based on 2D images and/or 3D data are also possible.

In some instances, an amount of noise may be associated with a determined state of a traffic intersection. At block 104, the method 100 includes determining an uncertainty associated with the determined state of the traffic intersection. In one example, the uncertainty associated with the determined state may be based on a confidence in a state of a traffic signal. For example, given an amount of noise associated with a sensor, a state of a traffic signal may be determined with a given confidence level.

In another example, the uncertainty associated with a traffic signal may be based on clarity of a traffic signal in an image. In some instances a location and/or orientation of the traffic signal may change, impacting the clarity of the traffic signal in an image. For instance, the nature of a structure of a traffic signal may cause the orientation to change (e.g., a traffic signal may swing when suspended from a cable, vibrate, etc.) or a traffic signal may be moved to a temporary location due to road construction. In another instance, the brightness or clarity of an image may be affected based on a position of the sun at various times of the day or night. In another example, an image of a traffic signal or traffic sign may be noisy in various weather conditions such as fog, snow, rain, etc. In still another example, a portion of the traffic signal may be partially obstructed in an image. For example, a tree or another vehicle may obstruct a portion of a traffic signal in an image.

In some examples, the clarity of the traffic signal may be compared to a predetermined threshold (e.g., a hue, brightness, etc.) to determine an uncertainty associated with a state of the traffic signal. In other examples, image processing may be used to determine an amount of contrast (e.g., a difference in luminance and/or color) between a green, yellow, or red object of a detected traffic signal and other portions of the image. The uncertainty may be related to the amount of contrast versus an expected amount of contrast for the green, yellow, or red object.

In other examples, the uncertainty may be determined based on a historical ability to determine the state of the traffic intersection based on the traffic signal. For instance, information for detected traffic signals may be logged and analyzed to determine statistical models for the traffic signals. In one example, a statistical model may indicate that a state of a given traffic signal is detectable 98% of the time. The example amount of time for the traffic signal may be used to determine an uncertainty for the traffic signal. For instance, a traffic signal whose state is detectable 95% of the time may have a lower uncertainty than a traffic signal whose state is detectable less than 95% of the time. In another example, a statistical model may indicate that a state of another traffic signal is often indiscernible at a given time of day. In still another example, a statistical model may indicate that an uncertainty for a state of a given traffic signal is above a threshold when a vehicle is traveling at a speed that is greater than an amount (e.g., 35 mph).

At block 106, the method 100 includes controlling the vehicle in the autonomous mode based on the determined state of the traffic intersection and the determined uncertainty. In some examples, a presumed state of the traffic intersection may be selected by a processing component based on the determined state of the traffic intersection and the determined uncertainty. As an example, if the determined uncertainty is low, and the state of the traffic signal is green, the vehicle may proceed through the traffic intersection and maintain its speed. Alternatively, if the uncertainty associated with a determined state of a traffic signal is high, the vehicle may determine additional information from a variety of different sources of information.

For instance, the vehicle may gather information (e.g., determined in real-time or previously from the one or more sensors or additional sensors) to confirm the state of the traffic signal. The information may indicate behavior of other vehicles, such as vehicles traveling in the same or opposite direction, or cross-traffic. In one example, the vehicle may determine information such as changes in speed or acceleration, or distances to vehicles in front of and/or behind the vehicle. A vehicle in front of the vehicle that is braking may be indicative of a traffic signal that is yellow or red. The information may also indicate behavior of pedestrians in a crosswalk. For example, a pedestrian walking in a crosswalk that is perpendicular to a direction of travel of the vehicle may be indicative of a traffic signal that is red. In some instances, the vehicle may move to an adjusted position and determine additional information. For instance, the vehicle may move to an adjacent lane that is also a path in the same direction through the traffic intersection and determine information about a state of the traffic signal or a state of a different traffic signal.

In other examples, the vehicle may request information from a passenger or driver of the vehicle regarding the state of a traffic intersection or a traffic signal. Based on information received from the passenger or driver, the behavior of the vehicle may be modified. In other examples, the vehicle may tap into a network of the traffic signal or multiple traffic signals to determine information about the state of the traffic intersection. For example, the vehicle may receive information about the state of a traffic signal or a traffic intersection from a wireless transmitter or transceiver located at the traffic signal, at a wireless tower, on a satellite, on another vehicle, etc.

Thus, the example method 100 may enable controlling a vehicle based on a state of a traffic intersection and a determined uncertainty associated with the state of the traffic intersection. A number of example implementations of the method 100 are described below in connection with FIGS. 2A-5B. For purposes of illustration, multiple example implementations are described. It is to be understood, however, that the example implementations are illustrative only and are not meant to limiting. Other example implementations are possible as well.

Figure 2A:
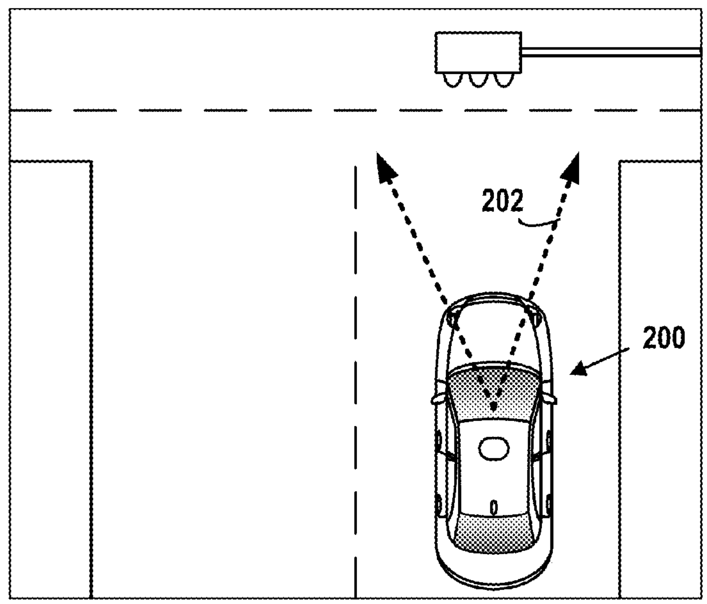
FIGS. 2A-2C are example conceptual illustrations of determining a state of a traffic intersection.
Figure 2B:
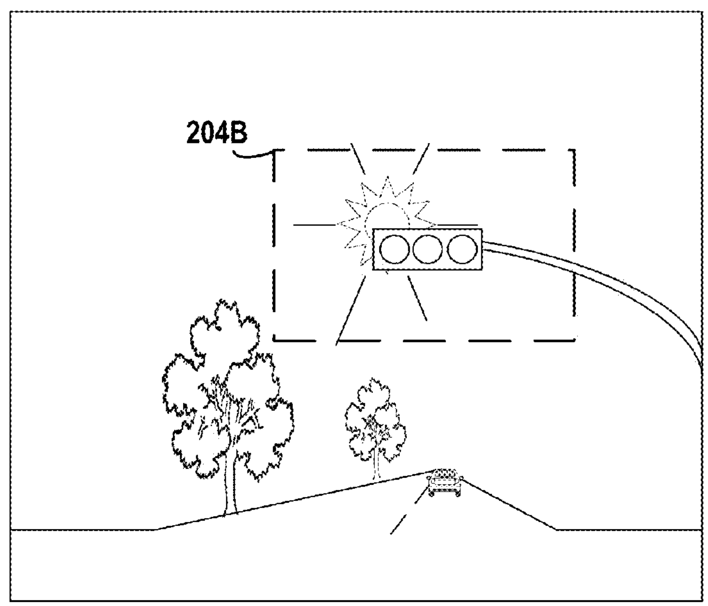
Figure 2C:
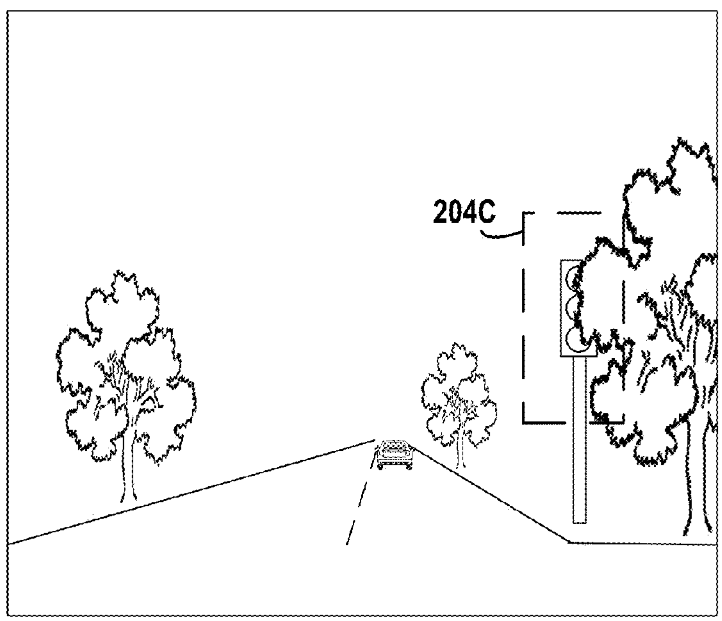

FIGS. 2A-2C are example conceptual illustrations of determining a state of a traffic intersection. For example, FIGS. 2A-2C illustrate a top view of a vehicle 200 and two perspective views from a position of the vehicle 200. In some examples, the vehicle 200 may scan a target area to determine information associated with a state of a traffic intersection. For example, information within a field of view 202 of the vehicle 200 may be obtained. In one instance, an imaging component and/or radar component of the vehicle may be used to obtain information within the field of view 202. The imaging component and radar component may be mounted behind or adjacent to a rear-view mirror, such that in a scenario in which the vehicle 200 includes a driver and/or passenger(s), the imaging component or radar component minimally obstructs a field of view of the deriver and/or passenger(s). In another scenario, the imaging component and/or the radar component may be mounted on the top of the vehicle 200.

As shown in FIG. 2B, in one example, the vehicle 200 may obtain an image of an area 204B. The image may include 2D and/or 3D information. In some examples, the area 204B may include one or more traffic signals and may optionally be predetermined based on known locations of traffic signals and a location and orientation of the vehicle 200.

In some examples, the clarity of an image of the area 204B may be affected by lighting conditions. As shown in FIG. 2B, the position of the sun may be located behind a position of a traffic signal at some times of the day. This may lead to an uncertainty that is higher than uncertainties for other times of the day when the clarity of the image is not affected by the position of the sun.

As shown in FIG. 2C, an image of an area 204C may also be obstructed by physical objects. For example, a tree limb may obstruct a portion of a traffic signal in an image of the area 204C. In one example, a 3D image of the area 204C may reveal objects at multiple distances from the position of the vehicle in a region for which a traffic signal is expected. For example, a first distance may be determined to a point in the area 204C that is closer to the vehicle than a group of points in the area 204C that are in the shape of a portion of a traffic signal. This may be indicative of an object that is obstructing a view of the traffic signal. In some instances, a high uncertainty may be determined for instances in which an object is obstructing a view of the traffic signal.

In one example scenario, respective states of multiple traffic signals of a traffic intersection may be determined. For example, two or more traffic signals may control a flow of traffic for two or more lanes of vehicles moving in a given direction. In an instance in which states are determined for multiple traffic signals, an uncertainty associated with a state of the traffic intersection may be determined based on the multiple states.

FIG. 3 is an example state table 300 for determining an uncertainty associated with a state of a traffic intersection. The state table 300 may indicate an uncertainty that is determined for given states of a traffic signal A and a traffic signal B. In one example, the traffic signal A and the traffic signal B may control the flow of traffic for two adjacent lanes of travel which follow the same path through a traffic intersection.

As shown in FIG. 3, given a state 302 in which the state of traffic signal A and the state of traffic signal B are both red, an output 304 of a low uncertainty may be determined. In another instance, a state of a first traffic signal for a current lane of the vehicle may be green, and a state of another traffic signal for an adjacent lane may be red. According to the state table 300, a high uncertainty may be determined. In one example, the determined uncertainty may be high such that the behavior of the vehicle is modified in a conservative manner (e.g., preventing a dangerous crossing of a traffic intersection).

In some examples, an uncertainty associated with a determined state of a traffic intersection may be weighted by an implication of a meaning of the determined state. For instance, given that two lanes of traffic which follow the same path through a traffic intersection are often controlled in a similar manner, the scenario in which a determined state of a first traffic signal is red and a determined state of a second traffic signal is green is unlikely to occur. If any information indicates that a state of an adjacent traffic signal may be red while a determined state of a first traffic signal is green, a high uncertainty may be determined for the state of the traffic intersection, and the vehicle may determine additional information about the state of the traffic intersection. In some examples, if a vehicle has any uncertainty at all about a state of a traffic intersection, it may be better to stop or slow the vehicle in order to determine additional information prior to proceeding through the traffic intersection, and control of the vehicle may be modified accordingly.

In another example, if a state of traffic signal A or a state of traffic signal B is unknown, a high uncertainty may be determined. A scenario in which a state of a traffic signal is undetectable may imply that information associated with the traffic intersection has changed. For example, a location of a traffic signal may have been moved. Given the high uncertainty, control of the vehicle may be modified to determine additional information about the state of the traffic intersection.

Figure 4:
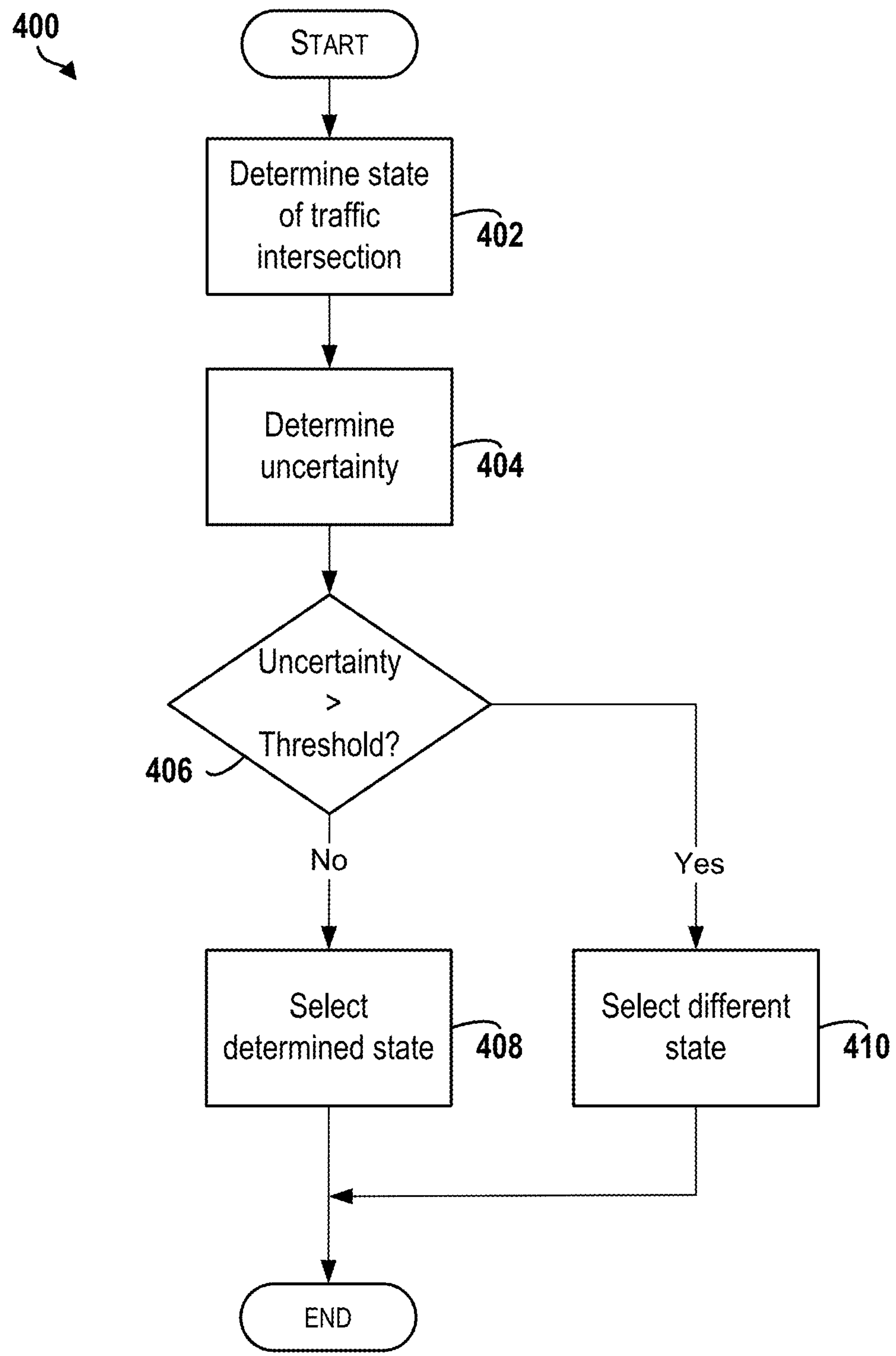
FIG. 4 is an example flow chart for determining a state of a traffic intersection.

FIG. 4 is an example flow chart 400 for determining a state of a traffic intersection. As shown, at block 402, a state of a traffic intersection may be determined. For instance, an autonomous vehicle may use information from one or more sensors to determine a state of a traffic signal, or determine a vehicle having precedence at a four-way stop. Additionally, at block 404, an uncertainty associated with the determined state of the traffic intersection may be determined. In one example, the uncertainty may be an amount of clarity of a state of a traffic signal within an image. In other instances, the uncertainty may be based on an amount of noise of a sensor, or a historical ability to determine a state of a traffic intersection using information associated with a traffic signal or traffic sign.

Subsequently, at block 406, a determination may be made whether the determined uncertainty is greater than a predetermined uncertainty threshold. In one example, if the uncertainty is less than the uncertainty threshold, at block 408 the determined state may be selected by a processing component of the vehicle as the state of the traffic intersection. This may be likened to selecting a presumed state of the traffic intersection as a state of the traffic intersection, and controlling the behavior of the vehicle based on the presumed state.

In another example, if the uncertainty is greater than the uncertainty threshold, at block 410, a different state than the determined state of the traffic intersection may be selected by the processing component. For example, the processing component may defer to a different state due to the determined uncertainty associated with the determined state. In some instances, the different state of the traffic intersection may be a more restrictive or conservative state than the determined state of the traffic intersection.

Figure 5A:
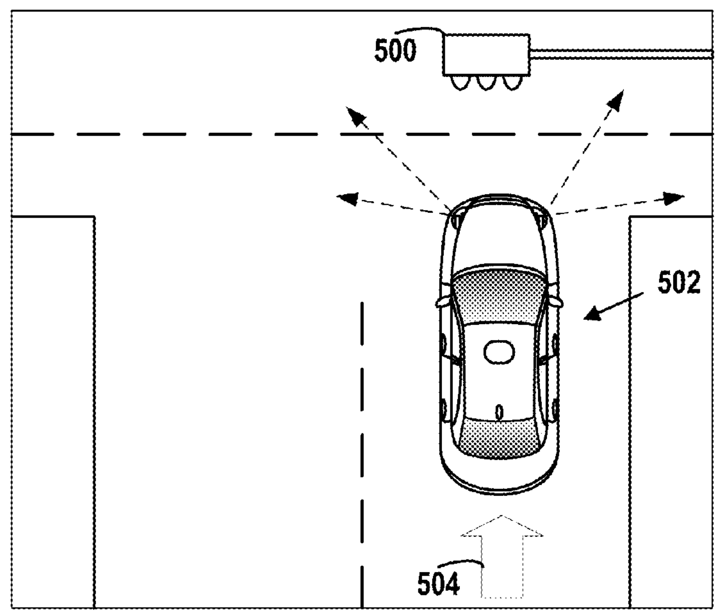
FIGS. 5A-5B are example conceptual illustrations of controlling a vehicle.
Figure 5B:
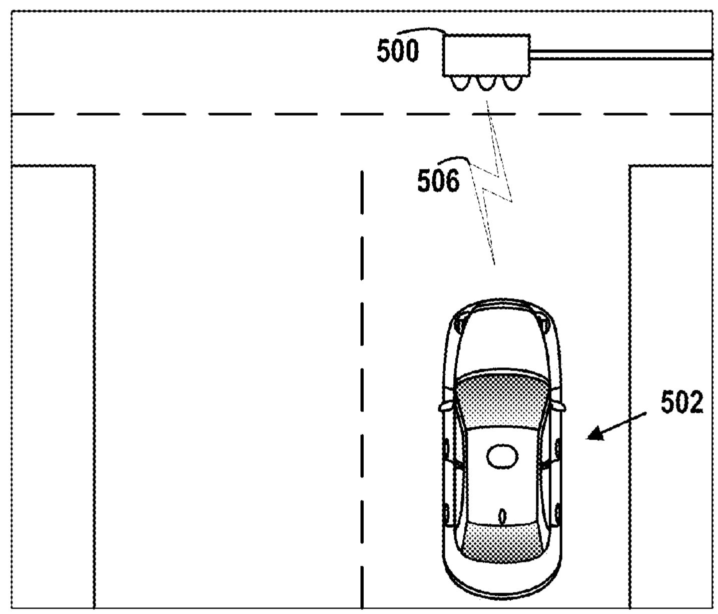

As an example, a state of a traffic signal may be detected to determine the state of the traffic intersection, and the state of the traffic signal may be green. A presumed state of the traffic intersection may be that traffic is flowing through the traffic intersection via a path in which the vehicle is located. However, the determined state of the traffic signal may include an amount of uncertainty that is greater than the threshold. Accordingly, a more restrictive state than the presumed state may be selected, and control of the vehicle may be modified based on the determined uncertainty such that the vehicle stops or slows down and determines additional information associated with the state of the traffic intersection before proceeding according to the presumed state and traveling through the traffic intersection. As an example, if a determined state of a traffic signal is green and an uncertainty associated with the determined state is high, a presumed state of yellow or red may be selected FIGS. 5A-5B are example conceptual illustrations of controlling a vehicle. In some examples, a traffic intersection may be controlled by a traffic signal 500. As shown in FIGS. 5A-5B, a vehicle 502 may determine a state of the traffic signal 500 to determine a state of the traffic intersection. Additionally, an uncertainty associated with a determined state of the traffic signal 500 and associated traffic intersection may be determined. In some instances, control of the vehicle may be modified based on the determined state and the determined uncertainty.

As shown in FIG. 5A, in an instance in which an uncertainty associated with the traffic intersection is high, the vehicle 502 may move in a direction 504 to an adjusted position. For example, the vehicle 502 may move slowly towards the traffic intersection. While the vehicle 502 is moving, the vehicle 502 may determine additional information associated with the intersection using one or more sensors of the vehicle 502. In some examples, the information may identify behavior of other vehicles, such as cross traffic approaching or traveling through an intersection. Based on the additional information, the vehicle 502 may re-determine the state of the traffic intersection. For example, if cross traffic is not stopping or yielding, the vehicle may stop or yield.

In some examples, the vehicle 502 may tap into a network of the traffic signal or multiple traffic signals to determine information about the state of the traffic intersection. For example, if an uncertainty associated with a traffic intersection is high, the vehicle 502 may communicate with a network via a wireless link 506 between the network and a wireless communication system of the vehicle 502. For example, the vehicle 502 may communicate with a computing system of the traffic signal via the wireless link 506. In one example, the vehicle 502 may receive information about the state of a traffic signal(s) via the wireless link 506 and compare the received information with the determined state of the traffic signal.

In some instances, the wireless communication system may include an antenna and a chipset for communicating with other vehicles, sensors, or other entities either directly or via a communication network. The chipset or wireless communication system in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system may take other forms as well.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and a camera 610.

Each of the first, second, and third sensor units 602-606 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 602 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or via a communication network. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown positioned on a roof of the vehicle 600, in other embodiments the wireless communication system 608 could be located, fully or in part, elsewhere.

The camera 610 may be any camera (e.g., a still camera, a video camera, etc.) configured to capture images of the environment in which the vehicle 600 is located. To this end, the camera 610 may be configured to detect visible light, or may be configured to detect light from other portions of the spectrum, such as infrared or ultraviolet light. Other types of cameras are possible as well. The camera 610 may be a two-dimensional detector, or may have a three-dimensional spatial range. In some embodiments, the camera 610 may be, for example, a range detector configured to generate a two-dimensional image indicating a distance from the camera 610 to a number of points in the environment. To this end, the camera 610 may use one or more range detecting techniques. For example, the camera 610 may use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the camera 610 may use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 may determine the distance to the points on the object. As yet another example, the camera 610 may use a time-of-flight technique in which the vehicle 600 emits a light pulse and uses the camera 610 to detect a reflection of the light pulse off an object at a number of points on the object. In particular, the camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The camera 610 may take other forms as well.

In some embodiments, the camera 610 may include a movable mount and/or an actuator, as described above, that are configured to adjust the position and/or orientation of the camera 610 by moving the camera 610 and/or the movable mount.

While the camera 610 is shown to be mounted inside a front windshield of the vehicle 600, in other embodiments the camera 610 may be mounted elsewhere on the vehicle 600, either inside or outside the vehicle 600.

The vehicle 600 may include one or more other components in addition to or instead of those shown.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 700 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to capture images of the environment in which the vehicle 700 is located. To this end, the camera may take any of the forms described above.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 100.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIG. 1. Further, data storage 714 may contain constraints 717 for the vehicle 700, which may take any of the forms described above. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-7.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing system such as the computing system 710 of FIG. 7 may be configured to provide various operations, functions, or actions in response to the programming instructions 804 being conveyed to the computing system 710 by one or more of the computer readable medium 806, the computer recordable medium 808, and/or the communications medium 810.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:

determining a state of a traffic intersection using information from one or more sensors of a vehicle, wherein determining the state of the traffic intersection comprises determining a state of a traffic signal of the traffic intersection, and wherein the vehicle is configured to operate in an autonomous mode;

determining an uncertainty associated with the determined state of the traffic intersection; and controlling the vehicle in the autonomous mode based on the determined state of the traffic intersection and the determined uncertainty associated with the determined state of the traffic intersection.

2. The method of claim 1, wherein the uncertainty associated with the determined state of the traffic intersection comprises an uncertainty associated with the determined state of the traffic signal.

3. The method of claim 2:

wherein determining the state of the traffic signal comprises obtaining an image of the traffic signal; and wherein the uncertainty associated with the determined state of the traffic signal comprises a clarity of the traffic signal in the image.

4. The method of claim 2, wherein the uncertainty associated with the determined state of the traffic signal comprises a historical ability to determine the state of the traffic signal.

5. The method of claim 4, wherein the historical ability comprises a probability that the state of the traffic signal is discernable at a given time of day.

6. The method of claim 4, wherein the historical ability comprises a probability that the state of the traffic signal is discernable when the vehicle is traveling at a speed that is greater than a threshold speed.

7. The method of claim 1:

wherein determining the state of the traffic intersection further comprises determining another state of another traffic signal of the traffic intersection; and wherein determining the uncertainty associated with the determined state of the traffic intersection comprises determining the uncertainty associated with the determined state of the traffic intersection based on both the state of the traffic signal of the traffic intersection and the other state of the other traffic signal of the traffic intersection.

8. The method of claim 1, wherein controlling the vehicle in the autonomous mode based on the determined state of the traffic intersection and the determined uncertainty associated with the determined state of the traffic intersection comprises controlling the vehicle according to a more restrictive state than the determined state of the traffic intersection in response to determining that the determined uncertainty associated with the determined state of the traffic intersection is greater than a predetermined uncertainty threshold.

9. The method of claim 1, wherein controlling the vehicle in the autonomous mode based on the determined state of the traffic intersection and the determined uncertainty associated with the determined state of the traffic intersection comprises (i) selecting a presumed state of the traffic intersection based on the determined state of the traffic intersection and the determined uncertainty associated with the state of the traffic intersection and (ii) controlling the vehicle in the autonomous mode based on the presumed state of the traffic intersection.

10. The method of claim 1, wherein controlling the vehicle in the autonomous mode based on the determined state of the traffic intersection and the determined uncertainty associated with the state of the traffic intersection comprises, in response to determining that the determined uncertainty associated with the state of the traffic intersection is greater than a predetermined uncertainty threshold:

moving the vehicle to an adjusted position;

obtaining from the adjusted position, using the one or more sensors of the vehicle, additional information that is indicative of the state of the traffic intersection; and controlling the vehicle in the autonomous mode based on the determined state of the traffic intersection and the additional information.

11. A non-transitory computer-readable medium having stored therein instructions executable by a computing device to cause the computing device to perform functions comprising:

determining a state of a traffic intersection using information from one or more sensors of a vehicle, wherein determining the state of the traffic intersection comprises determining a state of a traffic signal of the traffic intersection, and wherein the vehicle is configured to operate in an autonomous mode;

determining an uncertainty associated with the determined state of the traffic intersection; and controlling the vehicle in the autonomous mode based on the determined state of the traffic intersection and the determined uncertainty associated with the determined state of the traffic intersection.

12. The non-transitory computer-readable medium of claim 11, wherein the uncertainty associated with the determined state of the traffic intersection comprises an uncertainty associated with the determined state of the traffic signal.

13. The non-transitory computer-readable medium of claim 12:

wherein determining the state of the traffic signal comprises obtaining an image of the traffic signal; and wherein the uncertainty associated with the determined state of the traffic signal comprises a clarity of the traffic signal in the image.

14. The non-transitory computer-readable medium of claim 12, wherein the uncertainty associated with the determined state of the traffic signal comprises a historical ability to determine the state of the traffic signal.

15. The non-transitory computer-readable medium of claim 11, wherein controlling the vehicle in the autonomous mode based on the determined state of the traffic intersection and the determined uncertainty associated with the state of the traffic intersection comprises, in response to determining that the determined uncertainty associated with the state of the traffic intersection is greater than a predetermined uncertainty threshold:

moving the vehicle to an adjusted position;

obtaining from the adjusted position, using the one or more sensors of the vehicle, additional information that is indicative of the state of the traffic intersection; and controlling the vehicle in the autonomous mode based on the determined state of the traffic intersection and the additional information.

16. A vehicle configured to be operated in an autonomous mode, comprising:

one or more sensors configured to obtain information associated with a traffic intersection;

a memory;

a processor; and instructions stored in the memory and executable by the processor to:

determine a state of a traffic intersection based on the obtained information, wherein determining the state of the traffic intersection comprises determining a state of a traffic signal of the traffic intersection, determine an uncertainty associated with the determined state of the traffic intersection, and control the vehicle in the autonomous mode based on the determined stated of the traffic intersection and the determined uncertainty associated with the determined state of the traffic intersection.

17. The vehicle of claim 16, wherein the uncertainty associated with the determined state of the traffic intersection comprises an uncertainty associated with the determined state of the traffic signal.

18. The vehicle of claim 17:

wherein determining the state of the traffic signal comprises obtaining an image of the traffic signal; and wherein the uncertainty associated with the determined state of the traffic signal comprises a clarity of the traffic signal in the image.

19. The vehicle of claim 17, wherein the uncertainty associated with the determined state of the traffic signal comprises a historical ability to determine the state of the traffic signal.

20. The vehicle of claim 16, wherein controlling the vehicle in the autonomous mode based on the determined state of the traffic intersection and the determined uncertainty associated with the state of the traffic intersection comprises, in response to determining that the determined uncertainty associated with the state of the traffic intersection is greater than a predetermined uncertainty threshold:

moving the vehicle to an adjusted position;

obtaining from the adjusted position, using the one or more sensors of the vehicle, additional information that is indicative of the state of the traffic intersection; and controlling the vehicle in the autonomous mode based on the determined state of the traffic intersection and the additional information.

* * * * *